US011363000B1

(12) United States Patent
Birch

(10) Patent No.: US 11,363,000 B1
(45) Date of Patent: Jun. 14, 2022

(54) SYSTEM FOR VIRTUAL PRIVATE NETWORK AUTHENTICATION SENSITIVITY WITH READ ONLY SANDBOX INTEGRATION

(71) Applicant: BANK OF AMERICA CORPORATION, Charlotte, NC (US)

(72) Inventor: Christopher Daniel Birch, Dayton, OH (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 46 days.

(21) Appl. No.: 17/140,779

(22) Filed: Jan. 4, 2021

(51) Int. Cl.
*G06F 21/53* (2013.01)
*G06F 21/45* (2013.01)
*H04L 9/40* (2022.01)
*G06F 21/31* (2013.01)
*G06F 21/60* (2013.01)

(52) U.S. Cl.
CPC .......... *H04L 63/0272* (2013.01); *G06F 21/53* (2013.01); *H04L 63/0876* (2013.01); *G06F 2221/033* (2013.01)

(58) Field of Classification Search
CPC ............... H04L 63/102; H04L 63/0876; H04L 63/1425; H04L 61/2007; H04L 63/105; H04L 67/303; H04L 63/0272; G06F 21/53; G06F 2221/033
See application file for complete search history.

(56) References Cited

U.S. PATENT DOCUMENTS

| | | | |
|---|---|---|---|
| 6,665,715 B1* | 12/2003 | Houri | H04W 4/029 709/219 |
| 7,284,062 B2 | 10/2007 | Krantz et al. | |
| 8,176,553 B1 | 5/2012 | Magdych et al. | |
| 8,205,259 B2 | 6/2012 | Stute | |
| 8,213,898 B2* | 7/2012 | Choti | H04L 63/104 455/418 |
| 9,930,057 B2 | 3/2018 | Di Pietro et al. | |
| 10,091,312 B1* | 10/2018 | Khanwalkar | H04L 67/02 |
| 10,250,624 B2 | 4/2019 | Mixer et al. | |
| 10,270,790 B1 | 4/2019 | Jackson | |

(Continued)

OTHER PUBLICATIONS

User Profiling Through Browser Finger Printing. Ali. Atlantis Press. (Year: 2016).*

(Continued)

*Primary Examiner* — Venkat Perungavoor
(74) *Attorney, Agent, or Firm* — Moore & Van Allen PLLC; Nicholas C. Russell

(57) ABSTRACT

Embodiments of the invention are directed to a system that performs virtual private network authentication with a read only sandbox integration for virtual private network security. In this way, the invention matches an internet protocol address to a user portrait of user internet protocol addresses to confirm that the connecting device is the authentic user for accessing the virtual private network. If there is a discrepancy between the user portrait and the internet protocol address of the connecting device, the system launches a read only sandbox for connecting device interaction. The read only sandbox allows for bilateral communication with the connecting device where the system has full access to the connection device at a file level to interrogate file level data for confirmation.

20 Claims, 6 Drawing Sheets

(56) References Cited

U.S. PATENT DOCUMENTS

| | | | | |
|---|---|---|---|---|
| 10,356,101 | B2* | 7/2019 | Bercovich | G06N 7/005 |
| 10,778,681 | B1* | 9/2020 | Douglas | H04L 63/1425 |
| 11,087,309 | B2* | 8/2021 | Hayman | H04L 69/28 |
| 2006/0268902 | A1* | 11/2006 | Bonner | H04L 63/107 |
| | | | | 370/401 |
| 2008/0289047 | A1* | 11/2008 | Benea | G06F 21/64 |
| | | | | 726/27 |
| 2011/0032870 | A1* | 2/2011 | Kumar | H04W 12/02 |
| | | | | 370/328 |
| 2015/0222659 | A1* | 8/2015 | Abou-Rizk | H04L 63/1466 |
| | | | | 726/26 |
| 2018/0077185 | A1* | 3/2018 | Kovega | H04L 63/08 |
| 2019/0132323 | A1* | 5/2019 | Williams | H04L 63/083 |
| 2020/0220804 | A1* | 7/2020 | Mathews | H04L 45/12 |

OTHER PUBLICATIONS

User Identification and Tracking with Online Device Fingerprints Fusion. Takeda. IEEE. (Year: 2012).*
SHPF: Enhancing HTTP(S) Session Security with Browser Fingerprinting. Unger. IEEE. (Year: 2013).*
Linking virtual identities across service domains: an online behavior modeling approach. Wu. IEEE. (Year: 2017).*

* cited by examiner

SYSTEM FOR VIRTUAL PRIVATE NETWORK AUTHENTICATION SENSITIVITY WITH READ ONLY SANDBOX INTEGRATION

BACKGROUND

Accessing private networks via a remote access point is becoming more common. However, once the access is granted there is little to protect against unauthorized actors accessing an entities private network. As such, a need exists for authentication of access to private networks based on IP address locations and logic.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention are directed to a system that performs virtual private network authentication with a read only sandbox integration for virtual private network security. In this way, the invention matches an internet protocol address to a user portrait of user internet protocol addresses to confirm that the connecting device is the authentic user for accessing the virtual private network. If there is a discrepancy between the user portrait and the internet protocol address of the connecting device, the system launches a read only sandbox for connecting device interaction. The read only sandbox allows for bilateral communication with the connecting device where the system has full access to the connection device at a file level to interrogate file level data for confirmation.

Embodiments of the present invention address these and/or other needs by providing an innovative system, method and computer program product for virtual private network (VPN) authentication, the invention comprising: creating a user portrait of user IP address locations; identifying a connecting device attempting to connect to an entity network via a VPN connection; identifying a non-match between an IP address of the connecting device and one or more IP addresses with the user portrait; triggering a launch of a read only sandbox, wherein the connecting device is connected to the read only sandbox upon the non-match; allowing individual associated with connecting device to perform actions with the read only sandbox; performing an interrogation of file level data on the connecting device without allowing connecting device to gain access to the entity network; and storing learned file level data for security remediation.

In some embodiments, the read only sandbox allows system access to all file level data on the connecting device in a read only format. In some embodiments, the read only sandbox presents a graphical interface on the connecting device that simulates a user access to the entity network.

In some embodiments, the user portrait further comprises an identification of each location the user has authentic VPN access historically and logic to provide flexibility in a location of the user IP address locations.

In some embodiments, the invention further comprises identifying a non-match between the IP address of the connecting device and one or more IP addresses with the user portrait and allowing the connecting device to access a private entity network via VPN access.

In some embodiments, identifying the connecting device attempting to connect to the entity network further comprises identifying an IP address associated with the connecting device and connecting device location.

In some embodiments, performing an interrogation of file level data further comprises checking the connecting device MAC address, technical details, network, location, software, and computer log at the file level.

In some embodiments, allowing individual associated with connecting device to perform actions with the read only sandbox further comprises identifying if the action is a user typical action and allowing the connecting device access to the entity network upon determination of the action.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
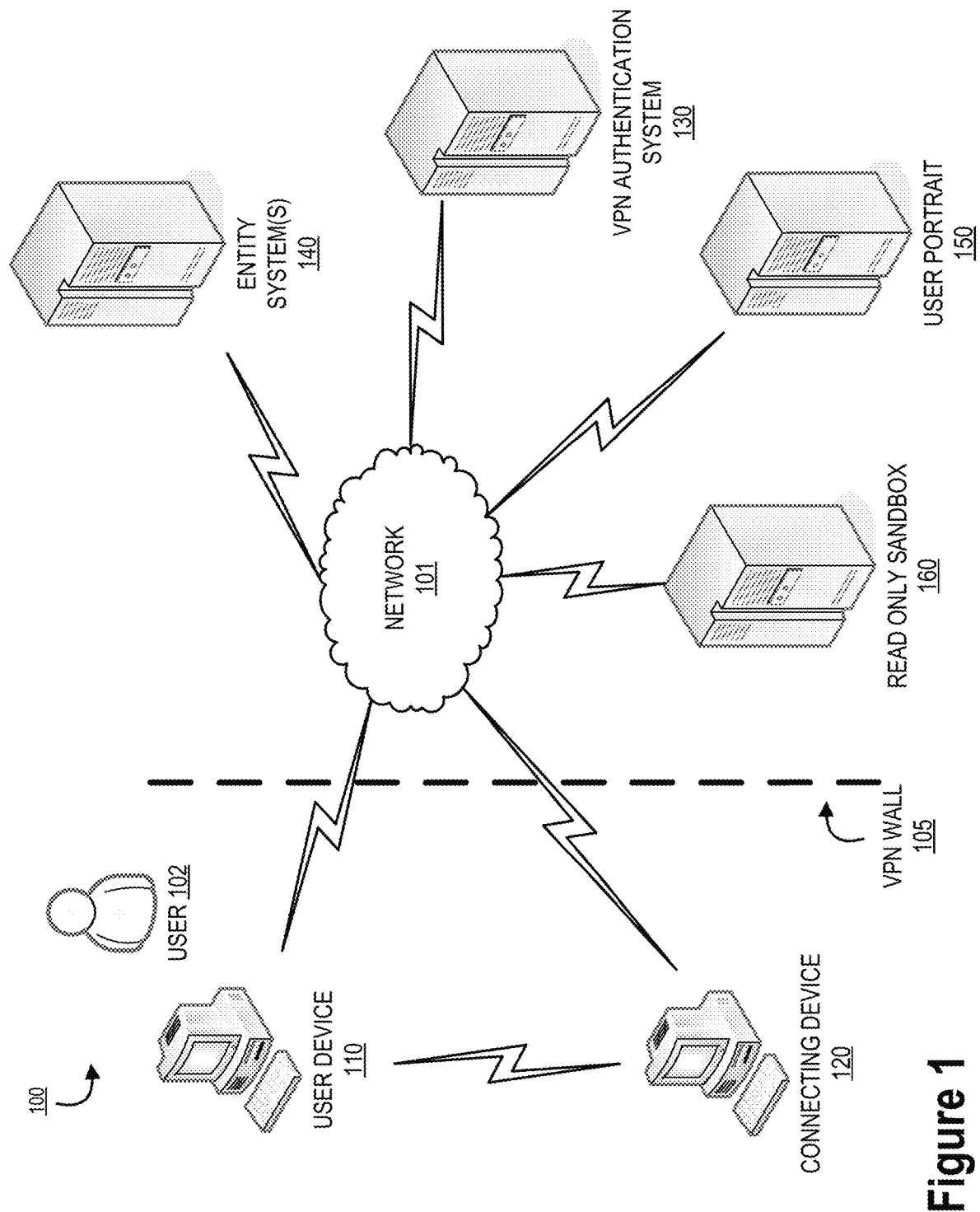
Figure 2:
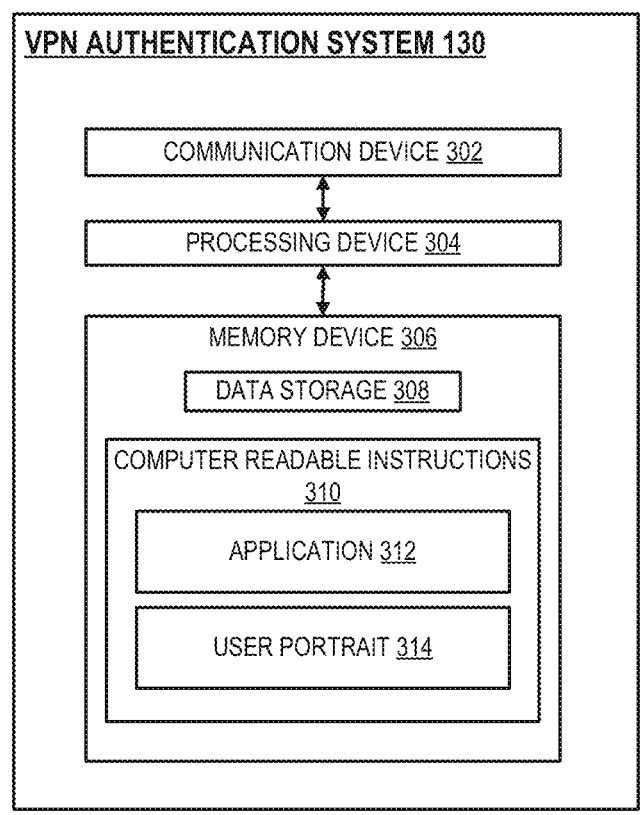
Figure 3:
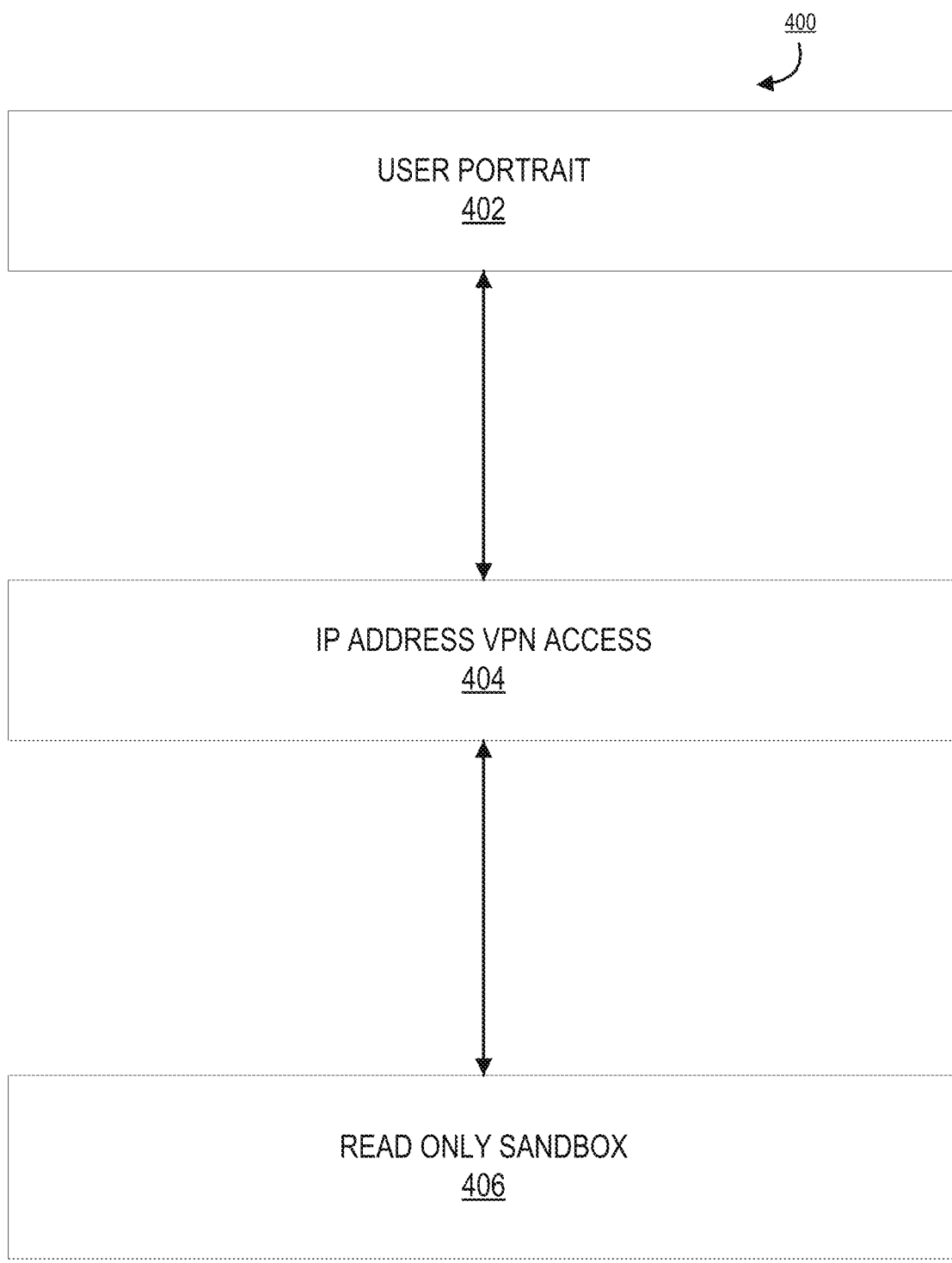
Figure 4:
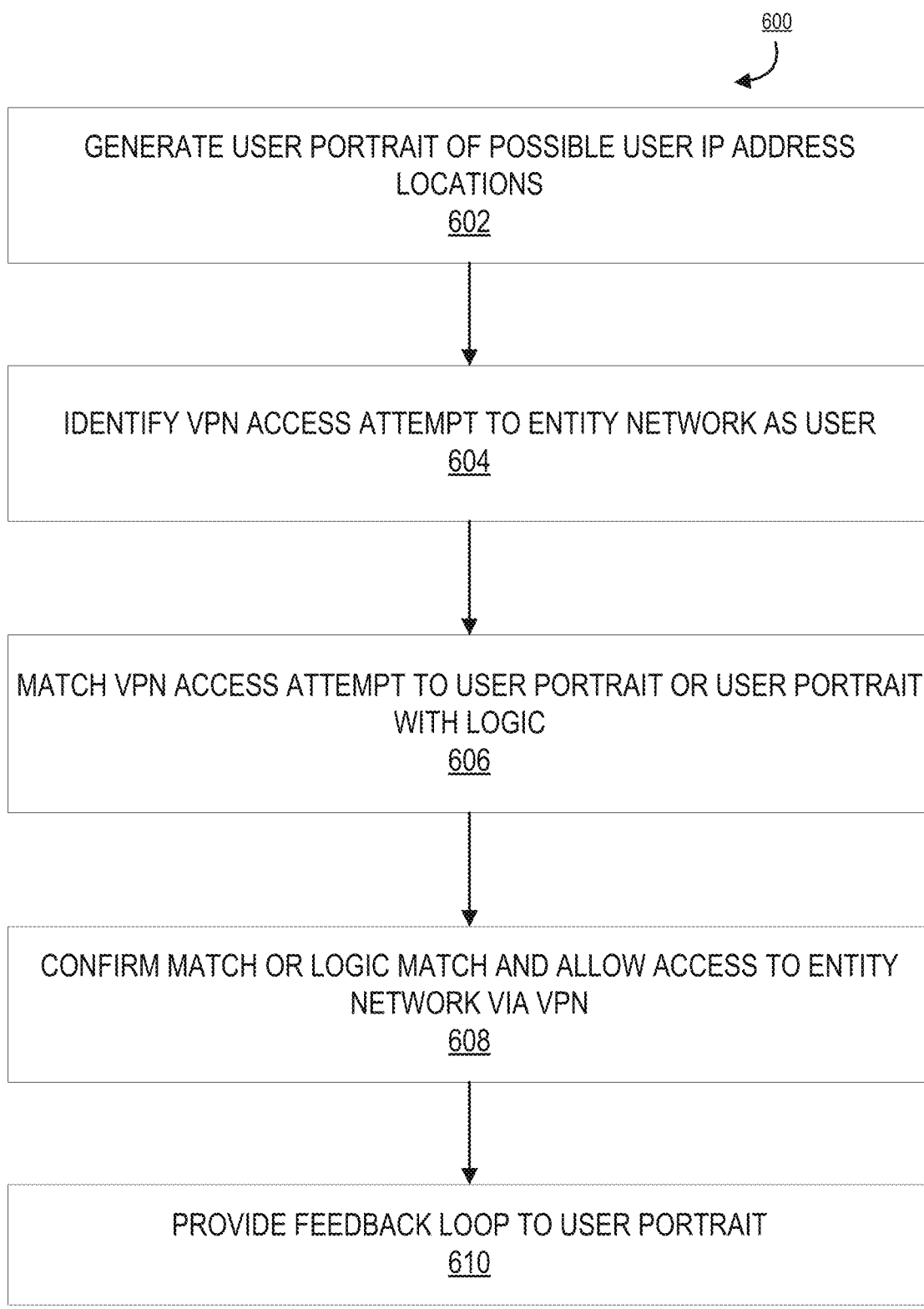
Figure 5:
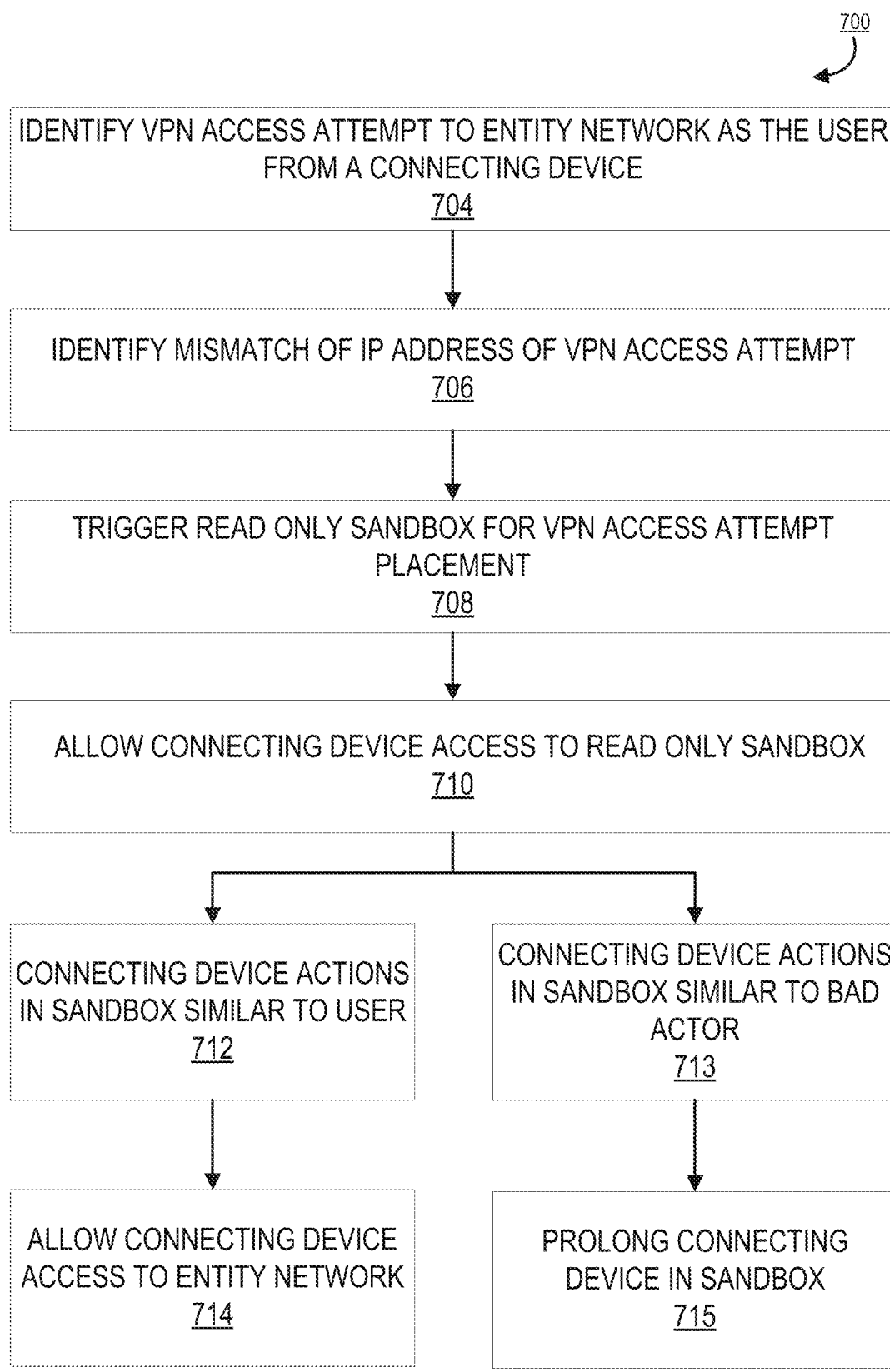
Figure 6:
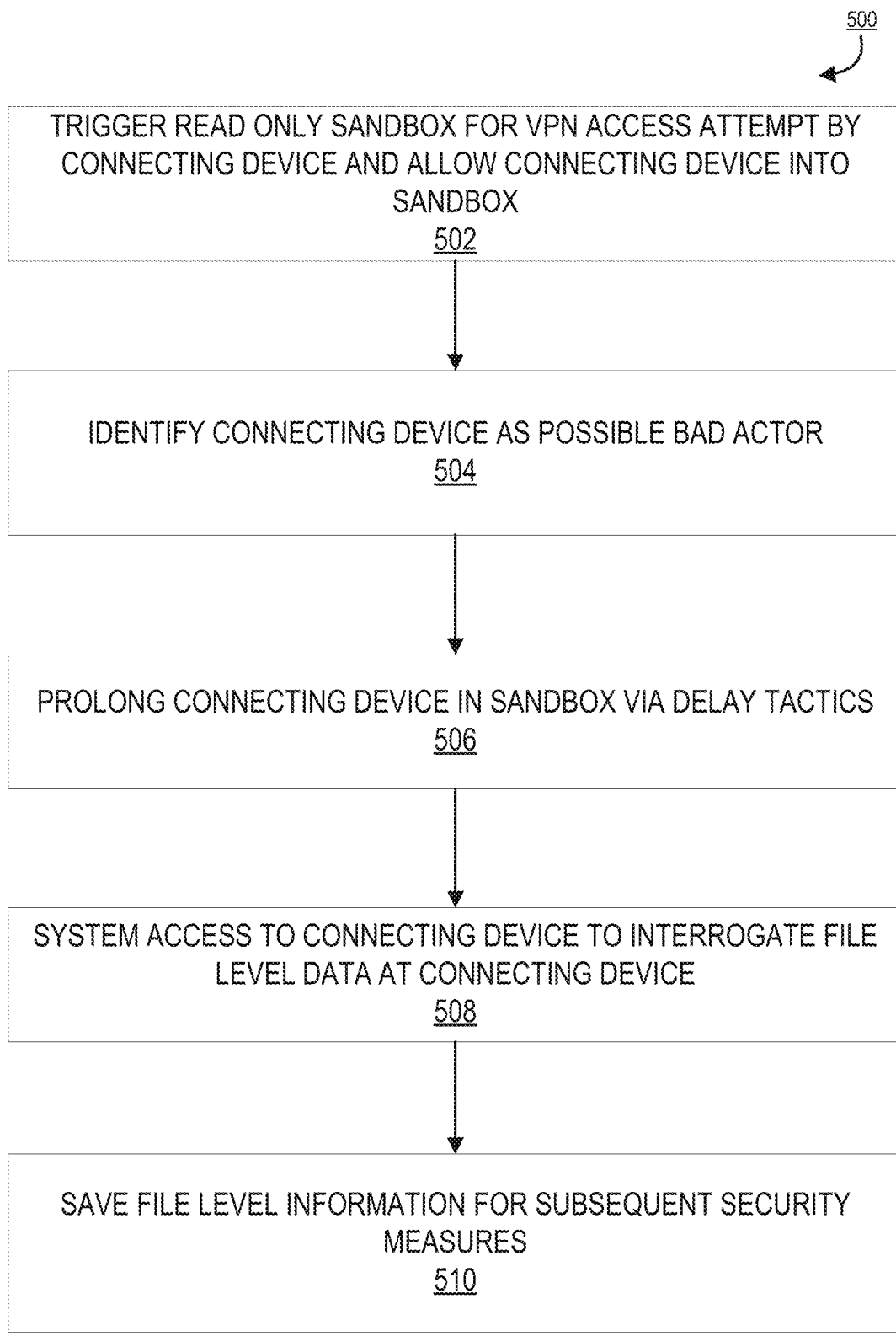

Having thus described embodiments of the invention in general terms, reference will now be made to the accompanying drawings, wherein:

FIG. 1 provides a VPN authentication sensitivity system environment, in accordance with one embodiment of the invention;

FIG. 2 provides a block diagram of a VPN authentication system, in accordance with one embodiment of the invention;

FIG. 3 provides a high level process flow illustrating the parts of the VPN authentication sensitivity with read only sandbox integration, in accordance with one embodiment of the invention;

FIG. 4 provides a high level process flow illustrating the VPN authentication sensitivity process, in accordance with one embodiment of the invention;

FIG. 5 provides a block diagram illustrating identifying a connective device within the VPN authentication sensitivity process, in accordance with one embodiment of the invention; and FIG. 6 provides a high level process map illustrating integrating a read only sandbox within the environment, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. In some embodiments, a device may refer to an entity's computer system, platform, servers, databases, networked devices, or the like. The device may be used by the user to access the system directly or through an application, online portal, internet browser, virtual private network (VPN), or other connection channel. The device may be a computer device within a network of connected computer devices that share one or more network storage locations.

As used herein, the term "computing resource" or "computing hardware" may be used to refer to elements of one or more computing devices, networks, or the like available to be used in the execution of tasks or processes. A computing resource may include processor, memory, or network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

A "user" as used herein may refer to any individual that may be accessing an entity network, this may include an employee or the like. A user may be associated with an entity. In some embodiments, a user may have access to a computing device user, a phone user, a mobile device application user, and may be an individual such as a system operator, database manager, a support technician, and/or employee of an entity.

In accordance with embodiments of the invention, the term "entity" may be used to include any organization or business having users utilize networks, such as virtual private networks to access the entity network. An entity may refer to a group of users, group of retailers, business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, a "connection" or an "interaction" may refer to any communication between one or more users, one or more entities or institutions, and/or one or more devices, nodes, clusters, or systems within the system environment described herein. For example, an interaction may refer to a transfer of data between systems or devices, an accessing of stored data by one or more devices, a transmission of a requested task, a reporting and correction of an error, or the like. In another example, an interaction may refer to a user interaction with a user device through a user interface in order to connect or communicate with an entity and/or entity system to complete an operation (e.g., request a transfer of funds from an account, complete a form, or the like).

As used herein, a "virtual private network" (VPN) may provide users with secure access to the entity system by creating a private network from a public internet connection to the entity network. The VPN masks the users' internet protocol (IP) address and connects the user to the entity system. The users IP address may refer to a unique string of characters that uniquely identifies the user's computer using the Internet Protocol to communicate over a network.

Embodiments of the invention provide a technical solution to VPN security problems by authenticating a connecting device to the VPN to a user portrait of known user IP addresses. This way, the system utilized the unique IP address of the connecting device to allow for or deny access to a VPN on the front end. This is unique in that currently a VPN may identify the IP address of the connecting device and allow the device to log into the network. At this time, the IP address is not utilized as an authentication for the user to gain access into the network. Furthermore, if a match is not identified, the system generates a read only sandbox for connecting device placement. The read only sandbox is a simulated network environment that is a read only network for the connecting device, but the network and system have full access to the connecting device. As such, if the connecting device is acting as a user would, the system may grant user access to the network via the VPN. However, if the connecting device is acting like a potential bad actor, the system may interrogate file level data from connected system without logged-in system gaining access to network, as such the system can check media access control (MAC) addresses, technical details, network, other devices on network, location, software, computer log, and the like at the file level for the connected device. As such, not only preventing the bad actor from gaining network access, but also gaining information about the bad actor to implement in future security measures.

Embodiments of the invention are directed to a system that performs virtual private network authentication with a read only sandbox integration for virtual private network security. In this way, the invention matches an internet protocol address to a user portrait of user internet protocol addresses to confirm that the connecting device is the authentic user for accessing the virtual private network. If there is a discrepancy between the user portrait and the internet protocol address of the connecting device, the system launches a read only sandbox for connecting device interaction. The read only sandbox allows for bilateral communication with the connecting device where the system has full access to the connection device at a file level to interrogate file level data for confirmation.

FIG. 1 provides a VPN authentication sensitivity system environment 100, in accordance with one embodiment of the invention. As illustrated in FIG. 1, the VPN authentication system 130 is operatively coupled, via a network 101 to the user device 110, connecting device 120, user portrait 150, the entity system 140, and the read only sandbox 160. In this way, the VPN authentication system 130 can send information to and receive information from the user device 110, connecting device 120, user portrait 150, entity system 140, and read only sandbox 160. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may be an entity network accessible remotely via a VPN protected by a VPN wall 105. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual associated with the entity, such as an employee of the entity. In some embodiments, the user 102 has a user device 110, such as a mobile phone, tablet, or the like that may interact with and be authenticated via the VPN wall 105 to gain access to the entity network. The user device 110 may generally include a processing device or processor communicably coupled to devices such as, a memory device, user output devices (for example, a user display device, or a speaker), user input devices (such as a microphone, keypad, touchpad, touch screen, and the like), a communication device or network interface device, a power source, and the like. The processing device may further include a central processing unit, input/output (I/O) port controllers, a graphics controller or GPU, a serial bus controller and a memory and local bus controller.

The processing device may include functionality to operate one or more software programs or applications, which may be stored in the memory device. For example, the processing device may be capable of operating applications such as the user application. The user application may then allow the user device 110 to transmit and receive data and instructions from the other devices and systems. The user device 110 comprises computer-readable instructions and data storage stored in the memory device, which in one embodiment includes the computer-readable instructions of a user application. In some embodiments, the user application allows a user 102 to access and/or interact with the environment 100.

The processing device may be configured to use the communication device to communicate with one or more other devices on a network 101 such as, but not limited to the VPN authentication system 130. In this regard, the communication device may include an antenna operatively coupled to a transmitter and a receiver (together a "transceiver"), modem. The processing device may be configured to provide signals to and receive signals from the transmitter and receiver, respectively. The signals may include signaling information in accordance with the air interface standard, cellular system of the wireless telephone network and the like, that may be part of the network. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with wireless communication protocols, such as Universal Mobile Telecommunications System (UMTS), CDMA2000, wideband CDMA (WCDMA) and/or time division-synchronous CDMA (TD-SCDMA), and/or the like.

The user device 110 may also include a memory buffer, cache memory or temporary memory device operatively coupled to the processing device. Typically, one or more applications, are loaded into the temporarily memory during use. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

Though not shown in detail, the system further includes an entity system 140 (as illustrated in FIG. 1) which is connected to the user device 110, the connecting device 120, the VPN authentication system 130, user portrait 150, and the read only sandbox 160 may be associated with one or more entities that the user may be employed by or required to join the entity network. In this way, while only one entity system 140 is illustrated in FIG. 1, it is understood that multiple network systems may make up the system environment 100. The entity system 140 generally comprises a communication device, a processing device, and a memory device. The entity system 140 comprises computer-readable instructions stored in the memory device, which in one embodiment includes the computer-readable instructions of a financial institution application. The entity system 140 may communicate with the user device 110, the connecting device 120, user portrait 150, the VPN authentication system 130, read only sandbox 160.

The connecting device 120 comprise the same or similar features as the user device 110 and the entity system 140. In some embodiments, the connecting device 120 may be a user devices 110. The connecting device 120 may be a device that is attempting to gain access to the network via VPN access through a VPN wall 105.

The read only sandbox 160 comprise the same or similar features as the user device 110 and the entity system 140. In some embodiments, the read only sandbox 160 may be a storage location for the sandbox that can be triggered and displayed to a connecting device 120. The read only sandbox 160 may generate and present a visually similar display to a connecting device 120 as would be displayed from the entity system 140. In this way, the system allows a connecting device 120 to access the sandbox, but not access any of the entity information associated with the entity system 140. Furthermore, the read only sandbox 160 is designed in a read only format, allowing for no access to any data on the read only sandbox 160, but allowing for an interrogation of file level data from the connecting device 120 in a bilateral communication format. In this way, gaining access to MAC address, technical details about the connecting device, network information about the connecting device 120, a location of the connecting device 120, software on the connecting device 120, a computer log of the connecting device 120, and the like.

The user portrait 150 comprise the same or similar features as the user device 110 and the entity system 140. In some embodiments, the user portrait 150 is a database with artificial intelligent systems and logic to identify if a location of an IP address attempting to access the VPN is a possible location of the user 102. In this way, the user portrait 150 may store various locations the user 102 uses to VPN into the network and includes logic that may provide a location buffer or flexibility to the VPN access if it is within a distance of the standard user VPN access location.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a block diagram of a VPN authentication system 130, in accordance with one embodiment of the invention. The VPN authentication system 130 generally comprises a communication device 302, a processing device 304, and a memory device 306. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 306 is operatively coupled to the communication device 302 and the memory device 306. The processing device 304 uses the communication device 302 to communicate with the network 101 and other devices on the network 101, such as, but not limited to the user device 110, the connecting device 120, user portrait 150, the entity system 140, and the read only sandbox 160. As such, the communication device 302 generally comprises a modem, server, or other device for communicating with other devices on the network 101.

As further illustrated in FIG. 2, the VPN authentication system 130 comprises computer-readable instructions 310 stored in the memory device 306, which in one embodiment includes the computer-readable instructions 310 of an application 312. In some embodiments, the memory device 306 includes data storage 308 for storing data related to the system environment, but not limited to data created and/or used by the application 312.

Embodiments of the VPN authentication system 130 may include multiple systems, servers, computers or the like maintained by one or many entities. FIG. 2 merely illustrates one of those systems that, typically, interacts with many other similar systems to form the distributed register. The VPN authentication system 130 will be outlined below in more detail. In some embodiments, financial institution systems may be part of the distributed register. Similarly, in some embodiments, the VPN authentication system 130 is part of an entity system 140. In other embodiments, the entity system 140 is distinct from the VPN authentication system 130. The VPN authentication system 130 may communicate with the entity system 140 via a secure connection generated for secure encrypted communications between the two systems.

In one embodiment of the VPN authentication system 130 the memory device 306 stores, but is not limited to, an application 312 and the user portrait 314. In some embodiments, the user portrait 314 stores data including, but not limited to, at least portions of the IP addresses associated with the user identified by the user portrait system 150. In one embodiment of the invention, both the application 312 and the user portrait 314 may associate with applications having computer-executable program code that instructs the processing device 304 to operate the network communication device 302 to perform certain communication functions involving described herein. The processing device 304 is configured to use the communication device 302 to gather data, such as data corresponding to VPN access attempts, IP addresses, and the like from various data sources.

FIG. 3 provides a high level process flow illustrating the parts of the VPN authentication sensitivity with read only sandbox integration 400, in accordance with one embodiment of the invention. The parts of the VPN authentication sensitivity with read only sandbox integration comprise a user portrait 402, IP address VPN access 404, and a read only sandbox 406.

The user portrait 402 comprises a database of possible user IP address locations. This may include the user's normal location and device that the user uses to VPN into the entity network. Furthermore, the user portrait 402 identifies other possible IP address locations of the user to develop a pattern of possible locations. Furthermore, the user portrait 402 further includes a logic metric that provides flexibility into the IP address location. In this way, if the user is 50 miles or 100 miles away from his/her user portrait location, the logic metric may identify that it is more like than not the user. Furthermore, the user portrait 402 may comprise an artificial intelligence engine that continually learns travel patterns, login patterns, and possible patterns of the user to continually improve the logic of the user portrait 402 for matching of the IP address location to the user portrait 402 to allow for user access to the network via the VPN.

The IP address VPN access 404 comprises preventing or denying access to the entity network until the system matches the IP address location to one or more locations identified within the user portrait 402. In this way, the system authorizes the user access into the entity network via VPN access based on a match of the connecting IP address location to an IP address location in the user portrait 402. Currently, VPN access allows any IP address location to access the entity network. Typically systems will log the IP address location, but will not authenticate the user based on that location. In this way, this invention utilizes the user IP address location to match it to a location within the user portrait 402 to allow the user to initially gain access to the network. As such, preventing access to the entity system without the matching.

The read only sandbox 406 comprises of a mock entity network that appears like the user's VPN home or launch page. However, the read only sandbox 406 does not have access to the actual entity network or any data associated therewith, as it is a sandbox. The system triggers the connecting device to the read only sandbox 406 upon a non-match of the IP address location and a known user IP address location on the user portrait 402. Once an individual is within the read only sandbox 406 the system can identify if the individual is the real user based on the actions the individual is taking on the read only sandbox 406 session.

Alternatively, the system may identify if the individual is a bad actor based on actions on the read only sandbox 406 not in line with typical user actions on the entity network. At that point, the system may, using the read only nature of the connected device, have full access to the connected device. The system may be able interrogate the file level data from the connected device without the connected device gaining access to the network. The system creates a bilateral communication with the connected device and can access and check the MAC address, technical details, network, other devices on the network, location, software, computer log, and the like on the connected device.

FIG. 4 provides a high level process flow illustrating the VPN authentication sensitivity process 600, in accordance with one embodiment of the invention. As illustrated in block 602, the process 600 is initiated by generating a user portrait of possible user IP address locations. The user portrait, as discussed, comprises a database of possible user IP address locations. This may include the user's normal location and device that the user uses to VPN into the entity network. Furthermore, the user portrait identifies other possible IP address locations of the user to develop a pattern of possible locations. Furthermore, the user portrait includes a logic metric that provides flexibility into the IP address location. The user portrait may further comprise an artificial intelligence engine that continually learns travel patterns, login patterns, and possible patterns of the user to continually improve the logic of the user portrait for matching of the IP address location to the user portrait to allow for user access to the network via the VPN.

Next, as illustrated in block 604, the process 600 continues by identifying the VPN access attempt that is attempting to access the entity network as the user. In this way, the system may identify the IP address and the location of the IP address that is attempting to VPN into the entity network. Using this information, the system may attempt to match the VPN access attempt to the user portrait, as illustrated in block 606. As such, the system may identify whether the connecting device IP address location is associated with an IP address location within the user portrait or within the user portrait logic.

As illustrate in block 608, the process 600 continues by determining that there is a match between the connecting device IP address location and an IP address location within the user portrait. With this match being completed, the system may allow for access to the entity network via the VPN. Finally, as illustrated in block 610, the system provides for a feedback loop of the IP address location of the connecting device to the user portrait to further predict learning of the IP address locations associated with the user for future user VPN authentication.

FIG. 5 provides a block diagram illustrating identifying a connective device within the VPN authentication sensitivity process 700, in accordance with one embodiment of the invention. The process 700 is initiated by identifying a VPN access attempting to access the entity network as the user from a connecting device, as illustrated in block 704. In this way, a user or other individual may be trying to access the entity network via a VPN remote access. The system may identify the VPN attempted access and also identify an IP address and IP address location associated with the connecting device attempting to VPN into the entity network. The IP address VPN access comprises preventing or denying access to the entity network until the system matches the IP address location to one or more locations identified within the user portrait. In this way, the system authorizes the user access into the entity network via VPN access based on a match of the connecting IP address location to an IP address location in the user portrait. Currently, VPN access allows any IP address location to access the entity network. Typically systems will log the IP address location, but will not authenticate the user based on that location. In this way, this invention utilizes the user IP address location to match it to a location within the user portrait to allow the user to initially gain access to the network. As such, preventing access to the entity system without the matching.

As illustrate in block 706, the process 700 continues by identifying a mismatch if the IP address location of the VPN access attempt compared to the user portrait. Since there was a mismatch in the IP address location of the connecting device and any of the IP address locations within the user portrait, the system may trigger the read only sandbox for the connecting device placement, as illustrate in block 708.

The read only sandbox comprises of a mock entity network that appears like the user's VPN home or launch page. However, the read only sandbox does not have access to the actual entity network or any data associated therewith, as it is a sandbox. The system triggers the connecting device to the read only sandbox upon a non-match of the IP address location and a known user IP address location on the user portrait. Once an individual is within the read only sandbox the system can identify if the individual is the real user based on the actions the individual is taking on the read only sandbox session. Alternatively, the system may identify if the individual is a bad actor based on actions on the read only sandbox not in line with typical user actions on the entity network.

Next, as illustrated in block 710, the process 700 continues by allowing the connecting device to gain access to the read only sandbox. In this way, the system may migrate the connecting device to the read only sandbox after an attempted VPN access to the entity network. As such, the connecting device will not gain access to the entity network, but instead the system directs the connecting device to the sandbox.

At this point, in some embodiments the system may identify a match between the connecting device IP address location and one or more of the IP address locations within the user portrait. In some embodiments, the system may identify no match between the connecting device IP address location and any of the IP address locations within the user portrait.

As illustrated in block 712, the process 700 continues by monitoring the connecting device to the sandbox and identifying that the actions of the individual associate with the connecting device within the sandbox is the same or similar to actions that the user typical takes when VPN into the entity network. As such, the system may allow the connecting device to the entity network based on the actions of the connecting device being similar to typical user actions, as illustrate in block 714.

As illustrated in block 710, the process 700 again allows the connecting device to gain access to the read only sandbox. The system then monitors the actions of the connecting device within the sandbox. If the actions of the individual associated with the connecting device is not similar to the actions of the user, the system may determine that the connecting device actions in the sandbox may be that of a bad actor, as illustrated in block 713. The system may prolong the connecting device in the sandbox in order to gain file level data from the connecting device, as illustrated in block 715. At that point, the system may, using the read only nature of the connected device, have full access to the connected device. The system may be able interrogate the file level data from the connected device without the connected device gaining access to the network. The system creates a bilateral communication with the connected device and can access and check the MAC address, technical details, network, other devices on the network, location, software, computer log, and the like on the connected device.

FIG. 6 provides a high level process map illustrating integrating a read only sandbox within the environment 500, in accordance with one embodiment of the invention. The process 500 is initiated by triggering the read only sandbox for VPN access attempt by a connecting device and allow the connecting device access into the sandbox. As such, the system may identify that no match is made between the connecting device IP address location and the user portrait IP addresses. If no match, the system triggers the read only sandbox that provides a visually similar look to the entity network but in a read only format. The triggered read only sandbox is presented to the connecting device for individual visualization.

Next, as illustrated in block 504, the process 500 continues by identifying the connecting device as a possible bad actor. This may be based on the actions of the actor being different than the normal actions of the user on the entity network. This may be based on file access, keystrokes, or the like that may be out of the ordinary for the user and the user's employment activities on the entity network.

Once the system identifies the connecting device as a possible bad actor, the system may prolong the connecting device in the sandbox via delay tactics, such as lag times, longer loading times, and the like.

The system may access the connecting device to interrogate the file level data within the connecting device, as illustrated in block 508. Finally, the system may save the file level information for subsequent security measures for the entity, as illustrated in block 510.

The system identifies the IP address or EBI address associated with the user. If this connection is a different IP address than usual for this user, the system may trigger additional authentications in order to allow for the external VPN connection. As such, if a user is compromised, the system will not allow a misappropriated attempt to access an internal private network via VPN unless the user IP address or EBI address is confirmed as a match to the user portrait. If it is not a match, the user is either logging on from a different location or it is a misappropriated attempt to access the network. The system may trigger an advanced authentication request to the requesting device or to a known user device to confirm it is the user accessing the network before allowing the new IP address to gain access to the network. The system could learn, via artificial intelligence, the new IP addresses of the user devices logging into a VPN when using alternative user devices that may have alternative IP address. In this way, the system may be able to match multiple IP addresses to a user to access to the VPN via the user portrait.

The challenges are around establishing a baseline of expectations around connection IP locations. The system would have to establish and maintain a portrait for each network user, and then attempt to build machine learning that could anticipate variations. For example, the user is in City X proper. The user's IP address is in City X proper. The internet may go out or be disrupted and the user may have to login via a public Wi-Fi in City Y. The system is designed for logic to calculate distance and make a determination whether or not to accept the user's connection. The system would have to in real time ascertain connecting IP location and it differentiate between two suburbs of City X and City Y.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of optional steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for virtual private network (VPN) authentication, the system comprising:
   a memory device with computer-readable program code stored thereon;
   a communication device;
   a processing device operatively coupled to the memory device and the communication device, wherein the processing device is configured to execute the computer-readable program code to:
   create a user portrait of user IP address locations;
   identify a connecting device attempting to connect to an entity network via a VPN connection;
   identify a non-match between an IP address of the connecting device and one or more IP addresses with the user portrait;
   trigger a launch of a read only sandbox, wherein the connecting device is connected to the read only sandbox upon the non-match;
   allow individual associated with connecting device to perform actions with the read only sandbox;
   perform an interrogation of file level data on the connecting device without allowing connecting device to gain access to the entity network; and
   store learned file level data for security remediation.

2. The system of claim 1, wherein the read only sandbox allows system access to all file level data on the connecting device in a read only format.

3. The system of claim 1, wherein the read only sandbox presents a graphical interface on the connecting device that simulates a user access to the entity network.

4. The system of claim 1, wherein the user portrait further comprises an identification of each location the user has authentic VPN access historically and logic to provide flexibility in a location of the user IP address locations.

5. The system of claim 1, further comprises identifying a non-match between the IP address of the connecting device and one or more IP addresses with the user portrait and allowing the connecting device to access a private entity network via VPN access.

6. The system of claim 1, wherein identifying the connecting device attempting to connect to the entity network further comprises identifying an IP address associated with the connecting device and connecting device location.

7. The system of claim 1, wherein performing an interrogation of file level data further comprises checking the connecting device MAC address, technical details, network, location, software, and computer log at the file level.

8. The system of claim 1, wherein allowing individual associated with connecting device to perform actions with the read only sandbox further comprises identifying if the action is a user typical action and allowing the connecting device access to the entity network upon determination of the action.

9. A computer program product for virtual private network (VPN) authentication with at least one non-transitory computer-readable medium having computer-readable program code portions embodied therein, the computer-readable program code portions comprising:
   an executable portion configured for creating a user portrait of user IP address locations;
   an executable portion configured for identifying a connecting device attempting to connect to an entity network via a VPN connection;
   an executable portion configured for identifying a non-match between an IP address of the connecting device and one or more IP addresses with the user portrait;
   an executable portion configured for triggering a launch of a read only sandbox, wherein the connecting device is connected to the read only sandbox upon the non-match;
   an executable portion configured for allowing individual associated with connecting device to perform actions with the read only sandbox;
   an executable portion configured for performing an interrogation of file level data on the connecting device without allowing connecting device to gain access to the entity network; and an executable portion configured for storing learned file level data for security remediation.

10. The computer program product of claim 9, wherein the read only sandbox allows system access to all file level data on the connecting device in a read only format.

11. The computer program product of claim 9, wherein the read only sandbox presents a graphical interface on the connecting device that simulates a user access to the entity network.

12. The computer program product of claim 9, wherein the user portrait further comprises an identification of each location the user has authentic VPN access historically and logic to provide flexibility in a location of the user IP address locations.

13. The computer program product of claim 9, further comprising an executable portion configured for identifying a non-match between the IP address of the connecting device and one or more IP addresses with the user portrait and allowing the connecting device to access a private entity network via VPN access.

14. The computer program product of claim 9, wherein identifying the connecting device attempting to connect to the entity network further comprises identifying an IP address associated with the connecting device and connecting device location.

15. The computer program product of claim 9, wherein performing an interrogation of file level data further comprises checking the connecting device MAC address, technical details, network, location, software, and computer log at the file level.

16. The computer program product of claim 9, wherein allowing individual associated with connecting device to perform actions with the read only sandbox further comprises identifying if the action is a user typical action and allowing the connecting device access to the entity network upon determination of the action.

17. A computer-implemented method for virtual private network (VPN) authentication, the method comprising:
provide a computing system comprising a computer processing device and a non-transitory computer readable medium, where the computer readable medium comprises configured computer program instruction code, such that when said instruction code is operated by said computer processing device, said computer processing device performs the following operations:
creating a user portrait of user IP address locations;
identifying a connecting device attempting to connect to an entity network via a VPN connection;
identifying a non-match between an IP address of the connecting device and one or more IP addresses with the user portrait;
triggering a launch of a read only sandbox, wherein the connecting device is connected to the read only sandbox upon the non-match;
allowing individual associated with connecting device to perform actions with the read only sandbox;
performing an interrogation of file level data on the connecting device without allowing connecting device to gain access to the entity network; and
storing learned file level data for security remediation.

18. The computer-implemented method of claim 17, wherein the read only sandbox allows system access to all file level data on the connecting device in a read only format.

19. The computer-implemented method of claim 17, wherein the read only sandbox presents a graphical interface on the connecting device that simulates a user access to the entity network.

20. The computer-implemented method of claim 17, wherein the user portrait further comprises an identification of each location the user has authentic VPN access historically and logic to provide flexibility in a location of the user IP address locations.

\* \* \* \* \*